(12) United States Patent
Zhang et al.

(10) Patent No.: US 8,179,835 B2
(45) Date of Patent: May 15, 2012

(54) SYSTEM AND METHOD FOR EFFICIENTLY ALLOCATING WIRELESS RESOURCES

(75) Inventors: Guodong Zhang, Farmingdale, NY (US); Eldad M. Zeira, Huntington, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 854 days.

(21) Appl. No.: 12/171,422

(22) Filed: Jul. 11, 2008

(65) Prior Publication Data

US 2008/0267139 A1    Oct. 30, 2008

Related U.S. Application Data

(63) Continuation of application No. 10/750,204, filed on Dec. 31, 2003, now abandoned.

(60) Provisional application No. 60/494,878, filed on Aug. 13, 2003.

(51) Int. Cl.
*H04B 7/212* (2006.01)

(52) U.S. Cl. ........ 370/321; 370/326; 370/337; 370/347; 455/452.2

(58) Field of Classification Search .................. 370/280, 370/321, 329, 335, 337, 347; 455/452.1, 455/452.2

See application file for complete search history.

(56) References Cited

U.S. PATENT DOCUMENTS

| | | | |
|---|---|---|---|
| 6,714,523 B2 | 3/2004 | Zeira et al. | |
| 6,778,812 B1* | 8/2004 | Zhang | 455/67.13 |
| 6,791,961 B2 | 9/2004 | Zeira et al. | |
| 6,842,438 B1* | 1/2005 | Benedict et al. | 370/328 |
| 6,990,118 B2 | 1/2006 | Zeira et al. | |
| 7,023,815 B2 | 4/2006 | Zeira et al. | |
| 7,072,312 B2 | 7/2006 | Zeira et al. | |
| 2002/0015393 A1* | 2/2002 | Pan et al. | 370/335 |
| 2002/0176438 A1* | 11/2002 | Karjalainen | 370/441 |
| 2003/0027578 A1* | 2/2003 | Zeira et al. | 455/452 |
| 2003/0036358 A1 | 2/2003 | Pan | |

FOREIGN PATENT DOCUMENTS

| | | |
|---|---|---|
| JP | 11-234242 | 8/1999 |
| KR | 10-2000-0013204 | 3/2000 |
| KR | 10-2000-0013206 | 3/2000 |
| WO | 02/093785 | 11/2002 |

* cited by examiner

*Primary Examiner* — Marsha D Banks Harold
*Assistant Examiner* — Alvin A Zhu
(74) *Attorney, Agent, or Firm* — Volpe and Koenig, P.C.

(57) ABSTRACT

Dynamic resource allocation is performed by first generating a plurality of slot sequences. A figure of merit based on weighted interference signal code power (ISCP) and weighted resource units is then generated for each timeslot of each slot sequence. The timeslots within each slot sequence are then arranged in a decreasing figure of merit. The slot sequences are the processed to determine whether they can support the code to be transmitted.

6 Claims, 3 Drawing Sheets

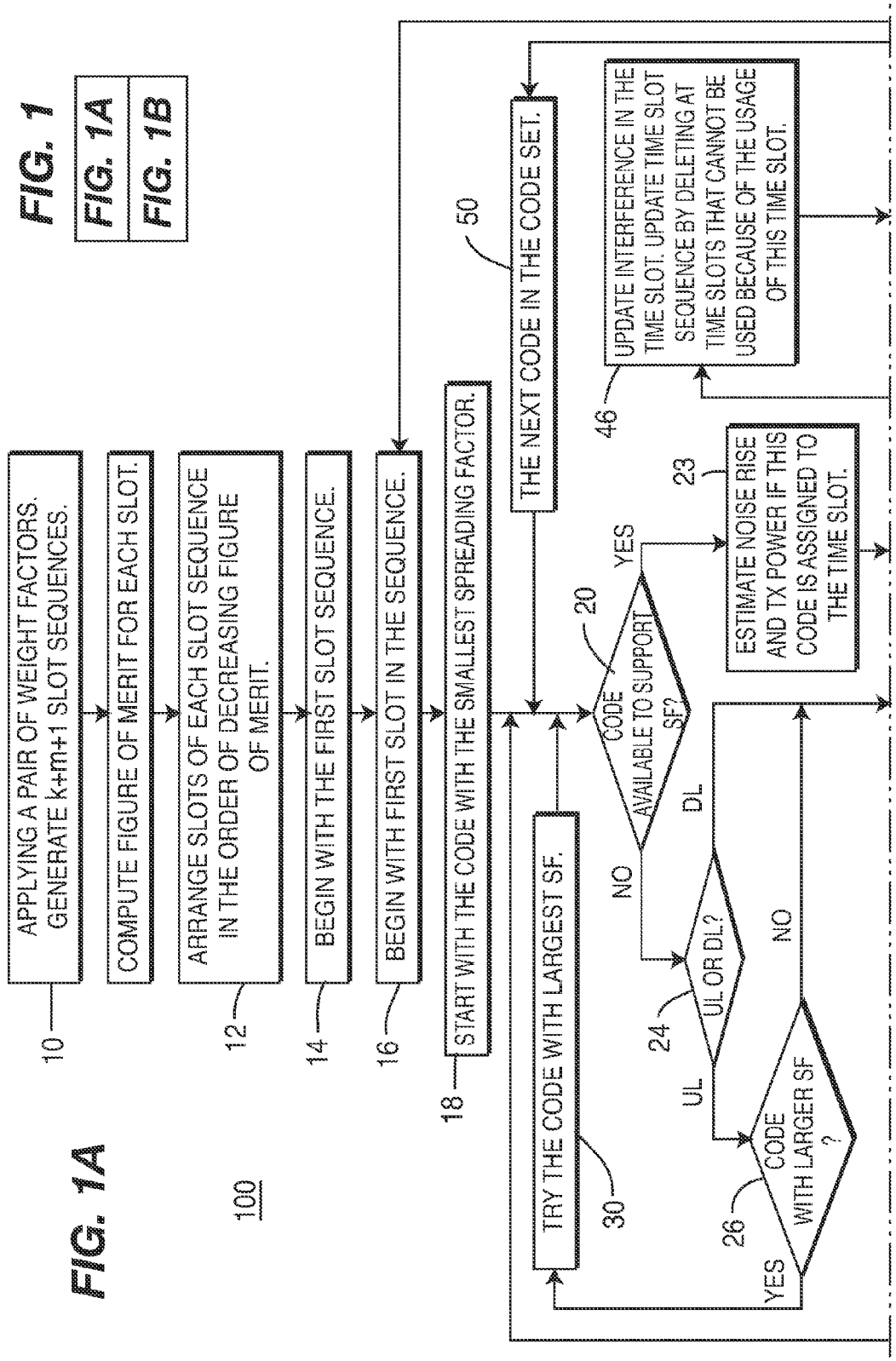

SYSTEM AND METHOD FOR EFFICIENTLY ALLOCATING WIRELESS RESOURCES

CROSS REFERENCE TO RELATED APPLICATION

Figure 1B:
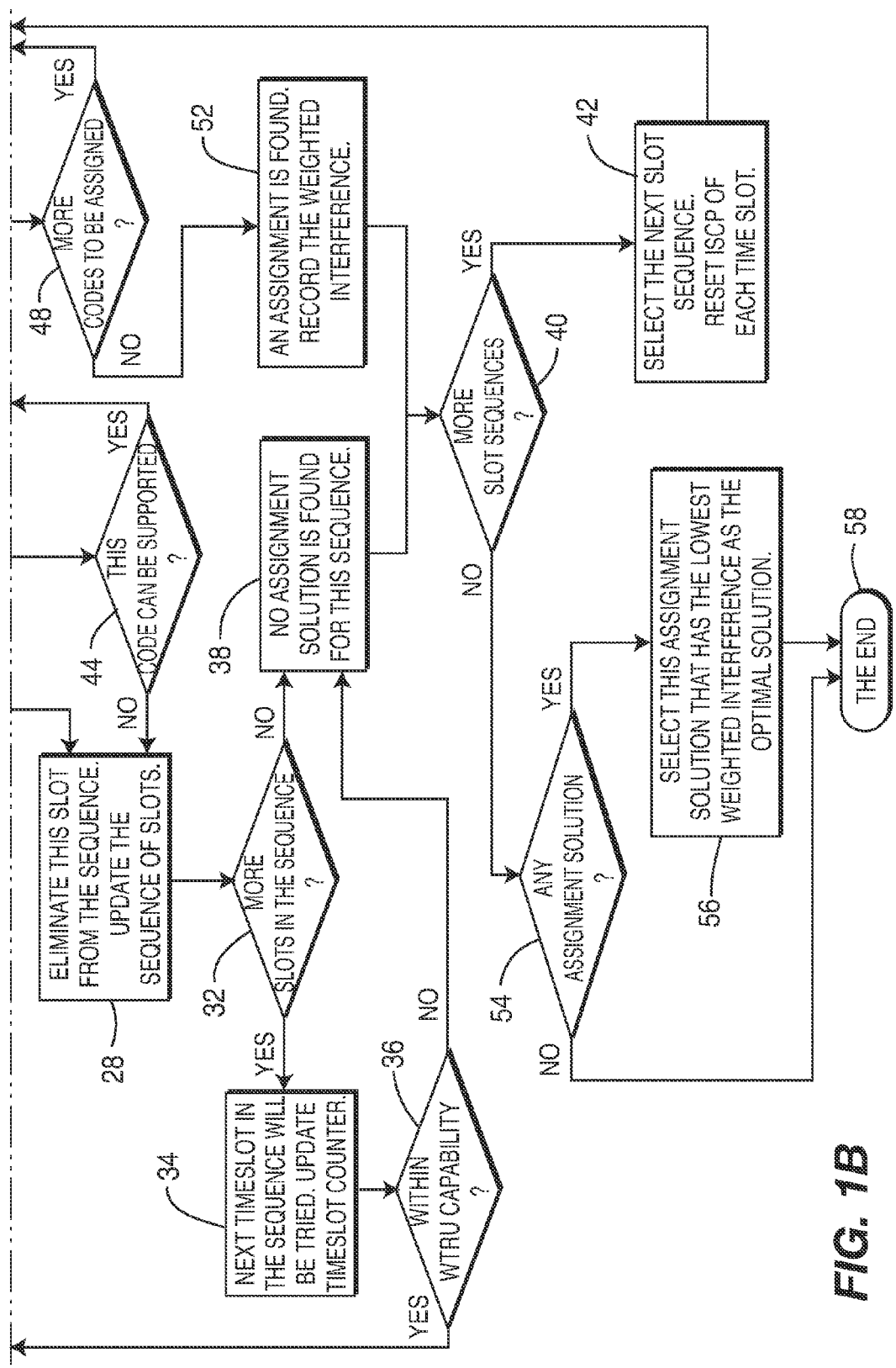

This application is a continuation of U.S. patent application Ser. No. 10/750,204, filed Dec. 31, 2003 which claims the benefit of U.S. provisional application no. 60/494,878, filed on Aug. 13, 2003, which is incorporated by reference as if fully set forth.

FIELD OF INVENTION

The present invention relates to wireless communication systems. More particularly, the present invention relates to a method for resource allocation in a wireless communication system.

BACKGROUND

All known communication standards impose limits on the use of system resources, regardless of the type of resources that are allocated. Resource management is used in communication systems to effectively allocate the limited amount of system resources to all users. Such resources may include timeslots, RF carriers or codes. For example, the Universal Mobile Telecommunication System (UMTS) Time Division Duplex (TDD) standards define a single carrier cell that includes a beacon and other common channels and timeslots. Accordingly, in this case, carrier selection is equivalent to cell selection.

In contrast, the China Wireless Telecommunication Standard (CWTS) group Time Division Synchronous Code Division Multiple Access (TD-SCDMA) System for Mobile (TSM) standard defines a multi-carrier cell. However, it requires that all physical channels that belong to a single application be assigned to the same carrier.

A generic multi-carrier TDD system can assign physical resources for a Wireless Transmit/Receive Unit (WTRU) in different timeslots of different carriers. For example, the Fast Dynamic Channel Allocation (F-DCA) algorithm is used to allocate resources (i.e. which timeslots on which carrier) for a user which is referred as a coded composite traffic channel (CCTrCH). This allocation is based on optimization of the assignment quality metric, which can be expressed as a combination of a timeslot-based assignment metric and a fragmentation metric for the whole CCTrCH. In a timeslot-based assignment metric, timeslot interference, timeslot transmit power, or timeslot loading is used. In the fragmentation metric for the whole CCTrCH, a fragmentation penalty of using multiple timeslots within one carrier is assigned, or a fragmentation penalty of using multiple carriers is assigned. Let TS_Frag_Penalty(j) denote the timeslot-based fragmentation penalty when j timeslots are used. For example TS_Frag_Penalty(j) is defined as:

$$\text{TS\_Frag\_Penalty}(j) = \begin{cases} p \cdot (j-1) & \text{if } 0 < j \le C \\ \infty & \text{if } j > C; \end{cases} \quad \text{Equation (1)}$$

where p is the timeslot-based fragmentation penalty increment, and C is the maximum number of time slots that a user can support.

Let Carrier_Frag_Penalty(j) denote the carrier-based fragmentation penalty when j carriers are used. For example, Carrier_Frag_Penalty(j) is defined as:

$$\text{Carrier\_Frag\_Penalty}(j) = q \cdot (j-1); \quad \text{Equation (2)}$$

where q is the carrier-based fragmentation penalty increment.

Although some WTRUs may use multiple receivers and have no implementation constraints on slot selection, most WTRUs have a single receiver and a finite switching time between uplink (UL) and downlink (DL) timeslots. Therefore, for most WTRUs, when timeslots from more than one carrier are used, the following two limitations apply: 1) if a timeslot is used by the WTRU in one carrier, the same timeslot cannot be used by the WTRU in other carriers; and 2) if a timeslot is used by the WTRU in one carrier, only timeslots that allow enough guard time apart from the used timeslot for the WTRU transceiver to switch frequencies can be used by the same WTRU in other carriers.

Those timeslots that cannot be used because of the usage of a particular timeslot and the two aforementioned limitations are defined as the set of banned timeslots of the particular timeslot.

Although channel allocation algorithms have been developed for TDD systems, these systems typically compromise a single carrier used by an operator. In multi-carrier TDD systems, the network has the freedom to assign the WTRU to one or several carriers. Therefore, there exists a need to properly allocate resources for multi-carrier TDD systems.

SUMMARY

According to the present invention, dynamic resource allocation is performed by first generating a plurality of slot sequences. A figure of merit based on weighted interference signal code power (ISCP) and weighted resource units (RUs) is then generated for each timeslot of each slot sequence. The timeslots within each slot sequence are arranged in a decreasing figure of merit. The slot sequences are then processed to determine whether they can support the code to be transmitted.

BRIEF DESCRIPTION OF THE DRAWING(S)

FIGS. 1A and 1B taken together are a flow diagram of a method in accordance with the present invention.

Figure 2:
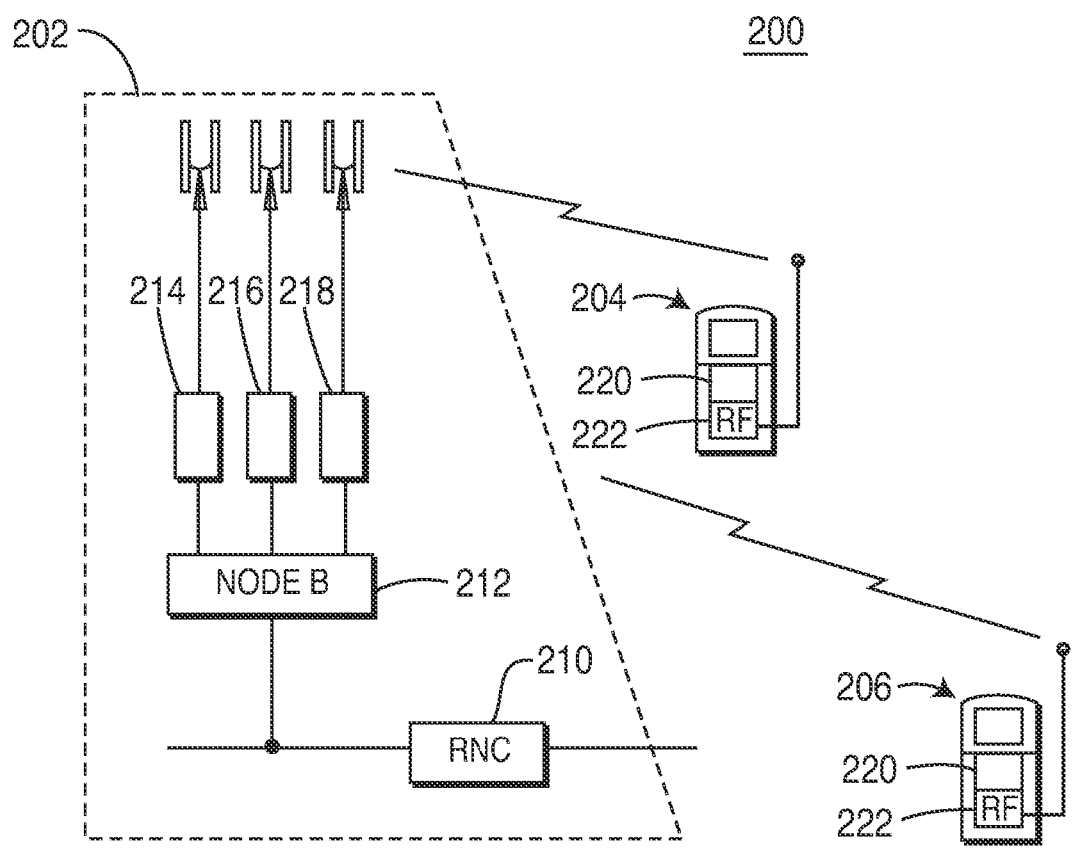

FIG. 2 is a block diagram of a multiple carrier communication system in accordance with the present invention.

DETAILED DESCRIPTION OF THE PREFERRED EMBODIMENT(S)

The present invention will be described with reference to the drawings figures where like numerals represent like elements throughout.

The preferred embodiments of the present invention are described in conjunction with a communication system supporting voice and data transmissions according to the Third Generation Partnership Project (3GPP) wideband code division multiple access (W-CDMA) communication system. However, it should be noted that the 3GPP system is used only as an example and the invention can be applied to other CDMA systems. While the exemplary embodiments are described in terms of wireless spread spectrum communications, the invention can be applied to other forms of slotted, non-slotted, multicarrier and single carrier communication systems, and can be applied broadly to all types of communication formats. In addition, the invention can be applied to communications which are wireless and which use hardwire connections. While base-to-mobile transmissions have been described, the inventive concepts are also useful in peer-to-peer communications.

As used herein, the term WTRU includes, but is not limited to, a user equipment, mobile station, fixed or mobile subscriber unit, pager or any other type of device capable of operating in a wireless environment. These exemplary types of wireless environments include, but are not limited to, wireless local area networks (WLANs) and public land mobile networks (PLMNs). The term base station, as used hereinafter, includes, but is not limited to, a Node B, site controller, access point or other interfacing device in a wireless environment.

According to an exemplary aspect of the present invention using the TSM standard, an improved resource allocation procedure is implemented. The TSM standard requires that all physical channels that belong to a single application be assigned to the same carrier. The resource allocation procedure in accordance with the present invention is performed for each carrier. Then, among all carriers, a selection is made of the carrier that yields the best assignment quality metric.

To support a CCTrCH in a generic multi-carrier TDD system, several codes are needed. Usually, those codes are arranged in the order of increasing spreading factor of the code. This arrangement of codes is called a code set. As understood by those of skill in the art, the lower the spreading factor of a code, the more RUs that are required to transmit the code.

Referring to FIG. 1, a dynamic resource allocation procedure 100 in accordance with the present invention is shown. The procedure 100 begins at step 10, whereby a plurality of slot sequences are generated. The slot sequences, which are a group of timeslots in a specific order, are generated by applying k+m+1 pairs of α and β values according to $\alpha^{(k)}=1\ \beta^{(k)}=2^k$ (sequence k+1) and $\alpha^{(k+m+1)}=2^m\ \beta^{(k+m+1)}=1$ (sequence k+m+1); where α is the weight parameter of ISCP and β is the weight parameter of the number of RUs that can used by the CCTrCH in the slot.

By applying k+m+1 pairs of α and β values, k+m+1 slot sequences, are generated as follows:

a) Since α is kept equal to 1 and β is increased, the following sequences favor low fragmentation:

$$\alpha^{(1)}=1 \beta^{(1)}=2^0 (\text{sequence } 1),$$

$$\alpha^{(2)}=1 \beta^{(2)}=2^1 (\text{sequence } 2),$$

$$\alpha^{(3)}=1 \beta^{(3)}=2^2 (\text{sequence } 3),$$

so that, $$\alpha^{(k)}=1 \beta^{(k)}=2^k (\text{sequence } k+1), \quad \text{Equation (3)}$$

b) Since β is kept equal to 1 and α is increased, the following sequences favor low interference:

$$\alpha^{(k+1)}=2^1 \beta^{(k+1)}=1 (\text{sequence } k+2),$$

$$\alpha^{(k+2)}=2^2 \beta^{(k+2)}=1 (\text{sequence } k+3),$$

so that, $$\alpha^{(k+m+1)}=2^m \beta^{(k+m+1)}=2 (\text{sequence } k+m+1), \quad \text{Equation (4)}$$

A figure of merit $F_i$ is then computed for each timeslot (step 11). The figure of merit Fi of slot i is generated as:

$$F_i = -\alpha \cdot \Delta I_i + \beta \cdot f(C_i); \quad \text{Equation (5)}$$

where $\Delta I_i$ is defined as $ISCP_i - ISCP_{min}$; $ISCP_i$ is the measured interference signal code power ISCP (in dB) in the slot i; $ISCP_{min}$ is the lowest ISCP (in dB) among all available timeslots in the same direction (i.e., UL or DL); and $f(C_i)$ is the amount of RUs that can be used by the CCTrCH of interest in the slot i.

The parameter $f(C_i)$ is calculated as:

$$f(C_i) = \min(C_i, \min(M, RU_{max\_slot})), \quad \text{Equation (6)}$$

where $C_i$ is the number of available RUs in the slot i; M is the amount of resource units required by the CCTrCH; and $RU_{max\_slot}$ is the maximum amount of RUs that can be used by this CCTrCH in one slot.

Assuming that the WTRU is supporting m CCTrCHs (where m≧1) simultaneously and that the number of codes used by other CCTrCHs of this WTRU in this timeslot is $N_{USED}$, since the WTRU has a capability of $N_{WTRU}$ codes per timeslot, the number of codes that this CCTrCH can use in this timeslot is $N_{WTRU} - N_{USED}$. Therefore, $RU_{max\_slot}$ is given by the highest amount of RUs that can be used by $N_{WTRU} - N_{USED}$ codes in the CCTrCH.

The timeslots of each slot sequence are then arranged in the order of decreasing figure of merit $F_i$ (step 12). This provides an arranged slot sequence.

Beginning with the first slot sequence (step 14) the first timeslot in the first slot sequence is selected (step 16). The code with the smallest spreading factor in the code set is also selected (step 18) since this will require the most RUs.

It is determined if there is a code with corresponding spreading factor available in the selected timeslot (step 20). If so, (i.e. the code is available and the assignment does not violate any capability of the WTRU, for example, the maximum number of time slots that can be used by a WTRU), and the procedure advances to step 23.

If the determination in step 20 is negative (i.e. a corresponding code is not available or the assignment violates some of the capabilities of the WTRU), then the action depends on whether it is an UL timeslot or a DL timeslot (step 24). If it is an UL timeslot, the procedure 100 advances to step 26. If it is a DL timeslot, the procedure 100 advances to step 28 since in the DL all codes have the same spreading factor and if the present code cannot be supported in the timeslot, none of the remaining unassigned codes would be able to be supported in the timeslot.

At step 26, it is determined if there is a code with a higher spreading factor in the code set. If so, the code from the code set with the next larger spreading factor is selected (step 30) and the procedure 100 reverts back to step 20. If a code from the code set with a higher spreading factor is not available, the procedure 100 advances to step 28, where the present timeslot is eliminated from the sequence of timeslots and the slot sequence is updated.

If there are any more timeslots left in the sequence (step 32), the next timeslot in the slot sequence is tried and a timeslot counter, which is initialized at the beginning of the analysis of each slot sequence, is updated (step 34). If there are no more timeslots left in the sequence as determined at step 32, no slot assignment solution can be found for this slot sequence (step 38).

It is then determined whether any more slot sequences are available (step 40). If so, the next slot sequence is selected (step 42) and the ISCP of each timeslot is reset. The procedure 100 then reverts back to step 16.

At step 36, it is determined whether the total number of timeslots that would be needed if this timeslot were to be used for the CCTrCH is within the capability of the WTRU. For example, some WTRUs may only be able to support a certain number of timeslots. An assignment solution that uses more timeslots than that number will automatically fail. If the total number of timeslots is within the capability of the WTRU, the procedure 100 reverts back to step 20. If the total number of timeslots it is not within the capability of the WTRU, the CCTrCH cannot be assigned to more timeslots and no slot assignment solution can be found for this slot sequence (step 38). The procedure 100 then advances to step 40.

Referring back to step 20, if the determination at step 20 is affirmative, an estimate is made of the noise rise and code transmit power in the timeslot if a code with this spreading factor is added (step 23). It is then determined if this spreading factor can be supported in the timeslot (step 44). This determination is made such that if the estimated noise rise and transmission power violates any of the following requirements, this spreading factor cannot be supported in this slot:

1. Noise rise cannot exceed a pre-determined threshold. The threshold is a design parameter.
2. Interference (ISCP) cannot exceed a pre-determined threshold. The threshold is a design parameter.
3. In the UL, WTRU transmission power cannot exceed its maximum allowed UL transmit power, (i.e. sum of transmit power of all codes for that UE in that timeslot).
4. In the DL, Node-B carrier power cannot exceed it's maximum transmit power defined by the power class, (i.e. sum of transmission power of all codes for all WTRUs in that timeslot).
5. In the DL, the difference between the code transmit power of any two codes in the same timeslot cannot exceed the maximum dynamic range. The value of maximum dynamic range is a design parameter.

If this code (i.e. the spreading factor) cannot be supported in the timeslot as determined at step 44, the procedure 100 advances to step 28.

If the code can be supported in the timeslot, the procedure 100 advances to step 46 where the interference in the timeslot is updated. The slot sequence is updated by deleting all timeslots that cannot be used in other carriers because of the usage of this timeslot.

It is then determined whether any more codes need to be assigned, (i.e., if there are any codes left in the code set (step 48)). If so, the procedure 100 advances to step 50 and an attempt is made to assign the next code in the code set into this timeslot. It should be noted that in this estimate, the ISCP should take the updated value.

If all codes have been assigned (step 48), an assignment solution has been found (step 52). This assignment solution is recorded for this slot sequence, (i.e. the number of codes and their spreading factors for each used timeslot within each used carrier). Assuming that the CCTrCH uses N carriers, and within each carrier n, $S_n$ timeslots are used, $ISCP_{total}(n)$ denotes the total interference of the CCTrCH in carrier n. The weighted interference, $ISCP_{weighted}$, is computed as total interference plus timeslot fragmentation penalty and carrier fragmentation penalty:

$$ISCP_{weighted} = \left(\sum_{n=1}^{N} ISCP_{total}(n) + \text{TS\_Frag\_Penalty}(S_n)\right) + \text{Carrier\_Frag\_Penalty}(N).$$

Equation (7)

If there are more slot sequences as determined at step 40, the next slot sequence is selected and the ISCP is reset to the ISCP of the first slot of the selected slot sequence. The procedure 100 then reverts back to step 16. In this way, other assignment solutions will be found, each with their corresponding weighted interference. If the slot selection for all the slot sequences has been performed as determined at step 40, it is determined if at least one sequence generated an assignment solution (step 54). If not, no assignment solution has been found in terms of power/interference availability and the procedure 100 is completed (step 58). If at least one assignment solution is found, the one with the lowest weighted interference among all assignment solutions is selected as the optimal assignment solution. The procedure 100 is completed (step 58).

FIG. 2 is a general configuration of a wireless communication system 200 which includes a core network 202, and a plurality of mobile WTRUs 204, 206. The network 202 includes a radio network controller (RNC) 210, coupled to a Node B 212, which is further coupled to a plurality of base stations 214, 216, 218. In operation, the network 202 communicates with the WTRUs 204, 206 through base stations 208. Each WTRU 204, 206 include a transceiver section 222 and a signal processing section 220 which, among other factors, assigns communications slots. In one embodiment, the procedure shown in FIG. 1 is performed at the RNC for dedicated channels, and performed at Node B for shared channels. For an ad hoc network, (such as WLAN), such a procedure can be performed at the WTRU.

What is claimed is:

1. A method for allocating timeslots in a time-slotted communication system to support transmission of a plurality of codes in a code set; the method comprising:
   generating a plurality of slot sequences utilizing at least one selectively weighted value, each slot sequence comprising a plurality of timeslots;
   calculating a figure of merit for each timeslot, the figure of merit being based, at least in part, upon said selectively weighted value;
   arranging said plurality of timeslots within each said slot sequence in order of a decreasing figure of merit to provide an arranged slot sequence; and
   comparing each of said plurality of codes within said code set to each said arranged slot sequence to determine whether said arranged slot sequence can support said code set and, if so, identifying the slot sequence as an assignment solution,
   wherein said comparing step further comprises estimating noise rise and transmit power of a selected timeslot if an available code is assigned to the selected timeslot and determining if noise rise and transmit power in the selected timeslot are excessive;
   wherein said comparing step further comprises updating the interference in the selected timeslot, and updating the slot sequence by deleting timeslots that cannot be used because of the use of the selected timeslot if the noise rise and transmit power in the selected timeslot are not excessive.

2. The method of claim 1, further comprising calculating a weighted interference value for each assignment solution.

3. The method of claim 2, further comprising selecting the assignment solution with the lowest weighted interference as the optimal solution.

4. The method of claim 1, wherein said at least one selectively weighted value comprises a weighted parameter related to interference signal code power (ISCP) α and a weight parameter related to the number of resource units (RUs) that can be used in a particular timeslot.

5. The method of claim 1, wherein the plurality of codes within said code set have a plurality of different spreading factors.

6. The method of claim 5, wherein said comparing step further comprises:
selecting the code within the code set with the smallest spreading factor;
selecting a timeslot in the arranged slot sequence;
determining whether there is a code available in the selected timeslot to support the smallest spreading factor and, if so, identifying the code as the available code.

* * * * *